(12) United States Patent
McPherson

(10) Patent No.: US 6,949,161 B2
(45) Date of Patent: Sep. 27, 2005

(54) ONE STEP MULTIPLE-PLY PANEL PRESSING

(75) Inventor: James McPherson, Longlac (CA)

(73) Assignee: Longlac Wood Industries Inc. (CA)

( * ) Notice: Subject to any disclaimer, the term of this patent is extended or adjusted under 35 U.S.C. 154(b) by 148 days.

(21) Appl. No.: 10/133,838

(22) Filed: Apr. 26, 2002

(65) Prior Publication Data

US 2003/0201054 A1 Oct. 30, 2003

(30) Foreign Application Priority Data

Mar. 20, 2002 (CA) ............................................. 2377417

(51) Int. Cl.$^7$ ........................... B32B 31/20; B32B 21/13
(52) U.S. Cl. ...................... 156/252; 156/62.2; 156/296; 156/331.4; 264/112
(58) Field of Search .............................. 156/62.2, 252, 156/296, 331.4; 264/112

(56) References Cited

U.S. PATENT DOCUMENTS

| | | | | |
|---|---|---|---|---|
| 4,655,869 A | * | 4/1987 | Tellman et al. | 156/252 |
| 4,844,763 A | * | 7/1989 | Robbins | 156/269 |
| 4,897,314 A | * | 1/1990 | Clarke et al. | 428/529 |
| 5,234,747 A | * | 8/1993 | Walser et al. | 428/215 |
| 5,643,983 A | * | 7/1997 | Lee | 524/267 |

FOREIGN PATENT DOCUMENTS

| | | | |
|---|---|---|---|
| CA | 2210558 | | 1/1999 |
| JP | 50157504 A | * | 12/1975 |
| JP | 6106502 | | 4/1994 |

* cited by examiner

Primary Examiner—Sam Chuan Yao
(74) Attorney, Agent, or Firm—Harness, Dickey & Pierce, P.L.C.

(57) ABSTRACT

A method for making in a single step a multiple-ply panel comprising the steps of forming and sandwiching a raw mat assembly of resinated furnish between two sheets of green incised wood veneer, applying a layer of thermosetting high-moisture tolerant adhesive at interfaces between the green veneer and core mat, and applying pressure and heat to cure the consolidated panel assembly for a duration sufficient to secure good internal bond within the substrate panel.

16 Claims, 1 Drawing Sheet

ONE STEP MULTIPLE-PLY PANEL PRESSING

This application claims priority to Canadian Patent Application Serial No. 2,377,417, filed Mar. 20, 2002.

FIELD OF THE INVENTION

This invention relates to the manufacture of plywood. More particularly, this invention relates to the manufacture of plywood having a resinated mat core such as a waferboard core.

BACKGROUND OF THE INVENTION

Hardwood plywood is defined in the ANSI/HPVA HP-1-2000standard as, "A panel composed of an assembly of layers or plies of veneer or veneers in combination with a lumber core, particleboard core, MDF core, hardboard core, or of special core material joined with an adhesive. Except for special constructions, the grain of alternate plies is at right angles and the face veneer is a hardwood species."

Traditionally hardwood plywood was made by "peeling" tree stems on a large rotary lathe to yield wet veneers of uniform thickness. The wet veneers were next clipped to uniform width and stacked in separate bins by grade. Then they were dried in roller dryers to remove excessive moisture as required for gluing and pressing, sorted again into different grades, repaired for natural defects and conditioned for uniform moisture content. Conditioned veneers were next coated with appropriate glue between adjacent plies, laid up in a veneer assemblies having face and back veneer as outer faces with respective grain angles along a "major axis", centres and intermediate plies with respective grain angles perpendicular to the face and back veneers, and a core which is an inner ply with a respective grain angle in the same direction as that of the outer plies.

The face and back veneers usually consist of thin decorative veneers from, such wood species as oak, cherry, birch, maple, etc. The inner plies were usually made from aspen, spruce and other lower cost species. The glued veneer assemblies were pre-pressed as a single stack for moisture equalization and tack build-up, and pressed in a multi-opening hot press into plywood panels. The final thickness of hardwood panels varied according to the number of plies. Each pressed plywood panel was held together by the cured resin bond. After conditioning in hot stacks, these plywood panels were trimmed to size (usually 4ft ×8 ft or 1.2 m ×2.4 m in nominal size), patched for external defects, and sanded to meet the product specification requirements.

More recently a process has been developed to substitute the veneer inner plies for a homogenous wafercore (a term for waferboard used as core) to simplify and improve the consistency of the core material. By adding intermediate plies of veneer on each side, the resulting wafercore substrate provides a uniform and stable surface for thin decorative veneers.

"Waferboard" is defined in CSA 0437.0-93 as, "A panel containing layers of only randomly placed wafers." "Wafers" in turn are defined as, "a specific type of wood flake produced as a primary function of specialized equipment (i.e. a waferizer) and having a controlled length of at least 30 mm (1¼ inch) along the grain direction, a controlled thickness, and a variable or controlled width. Each wafer is essentially flat and has the grain of the wood running predominantly in the plane of the wafer. In overall character, wafers resemble small pieces of thin veneer. Wafers purposely produced with a narrow width to facilitate alignment are called strands."

The more recent process yields a balanced panel of stressed-skin construction for industrial application with superior strength, good dimensional stability, good machinability and decorative advantage with less thickness variation and lower formaldehyde emissions than more traditional plywood panels. Either process has similar drawbacks in requiring the drying of green veneer which requires labour and time to monitor and control the drying conditions, plus costly natural gas as a purchased fuel to provide heat for the dryers.

Either process involves a significant amount of handling in the drying of the green veneer. The purchase and operation of a dryer represents capital and maintenance costs.

It is an object of the present invention to provide a faster and more economical process for the manufacture of composite plywood.

SUMMARY OF THE INVENTION

A method for making a multiple-ply wood composite panel including the steps of:
  (i) forming a panel substrate by sandwiching a mat of resinated furnish between two sheets of green incised wood veneer;
  (ii) applying a thermosetting and moisture compatible interface adhesive between the wet veneer sheets and resinated furnish to form an unconsolidated panel;
  (iii) applying pressure and heat to the unconsolidated panel in an amount and for a duration sufficient to cure the resin and the adhesive to form said composite panel.

The resinated furnish may be formed from wood wafers, wood strands, wood particles, wood fibres, wood veneer and lumber. In one embodiment the resinated finish is of random wafers.

Preferably, the sheets of green veneer are selected to be within a similar range of moisture content through a moisture sorting system in the ranges of 30% to 49%, 50% to 80%, 81% to 100% and over 100% based on an oven-dry method.

The interface adhesive may be an MDI resin system or equivalent in moisture resistance to be applied at a rate from 35 to 70 grams per square meter depending on wood species, surface roughness and moisture content of veneer. The resin may be cured at a temperature of from 130° C. to 190° C. and a pressure of from 24 to 28 kg/cm$^2$ for a duration of 4 to 6 minutes Heat may be applied from opposed hot press platens having a surface temperature of from 200° C. to 220° C. Resin curing time may be from 14 to 18 seconds/mm thickness depending on the board thickness, veneer moisture content and the type of adhesive system used.

Powder or liquid phenolic adhesives may be used for the resinated finish and may be applied in amounts from 1.75% to 2.5% by weight (dry basis) for a composite core material depending on the grade requirement. Alternatively, regular or fortified low-fume resins may be used for interior grade panels.

The depth of incision on green veneer sheets may be all the way through their respective thicknesses.

The composite panels formed as described above may be further sanded on one or both sides after pressing for lamination with thin decorative veneers as final face and/or back coverings.

DESCRIPTION OF THE DRAWINGS

Preferred embodiments of the present invention are described below with reference to the accompanying illustrations in which.

DESCRIPTION OF PREFERRED EMBODIMENTS

Figure 1:
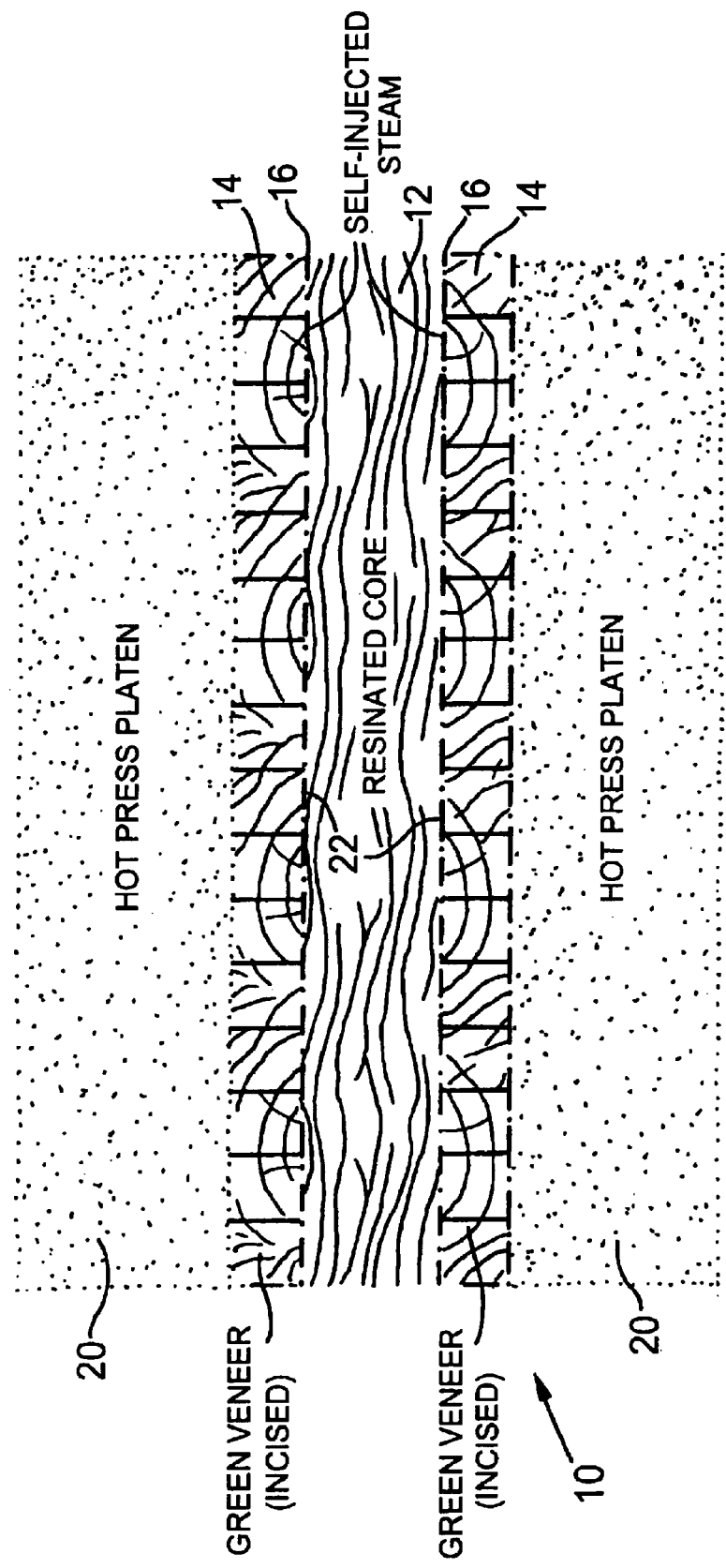
FIG. 1 is a schematic diagram illustrating a multiple-ply panel pressing process according to the present invention.

FIG. 1 illustrates a multiple-ply panel 10 between opposed platens 20 of a typical hot press. The balance of the hot press is not illustrated but would typically be steam or thermal-oil heated and of known construction. Representative of a suitable hydraulic hot press is a MULTI-DAYLIGHT® steam heated press with simultaneous arm closing and an electronic press controller. Alternatively, a continuous hot press with proper set-up can be used to achieve a similar result.

The panel 10 includes a mat of resinated furnish hereinafter referred to as "a resinated mat" 12 sandwiched between two sheets of green incised wood veneer 14. "Resinated furnish" is a term used to refer to wafers in combination with phenolic resins prior to consolidation. Between the veneer sheets 14 and the resinated mat 12 is a layer of thermosetting moisture-tolerant adhesive 16.

The panel 10 may initially be formed as an unconsolidated panel with two veneer sheets 14 coated with adhesive 16 applied to an inner face 22 of the sheets 14 or alternatively to the resinated mat 12 before overlaying the veneer sheets 14 over the resinated mat 12.

The unconsolidated panel I then pressed between the hot press platens 20 to cure the resinated furnish and set the interface adhesive and form the consolidated panel 10. The surface temperature of the platens 20, the type of resin and adhesive, the amount of resin and adhesive 16, the pressure and duration of heating and pressing must be selected to suit the dimensions and the grade of the panel being pressed. Using the pressing parameters set out below as a guideline, a skilled press operator can optimize the pressing strategy for a specific product.

The incising of veneer is becoming a common practice in the plywood industry. Basically, it involves using a proprietary cutter to make incisions in the veneer. The incisions may extend partially or completely through the veneer. The purpose of the incising is to provide a conduit for steam formed during hot pressing to escape easily through the veneer and avoid undesirable delamination due to blows and blisters at the end of the pressing cycle. Preferably the green wood veneer for the present process is incised completely through the veneer thickness, and the incisions are regularly spaced throughout the entire veneer sheet 14.

As the adhesive 15, an MDI resin (isocyanate resin) or an equivalent resin system can be applied at the rate from 35 to 70 grams per square meter depending on wood species, surface roughness and moisture content of veneer.

As a wafercore binder, a combination of "slack wax" and powdered or liquid phenolic resin may be used. Slack wax or emulsified wax would first be applied to the wood furnish at the rate from 0.75% to 1.0% by weight. Phenolic resin is subsequently applied at the rate from 1.75 to 2.5% by weight (oven-dry basis). Alternatively other resin systems such as high-moisture resistant low-fume fortified urea-formaldehyde resin can be applied as well.

The hot press platens would typically have a surface temperature from 190° C. to 220° C. depending on the resin system and moisture content of the mat assembly. Typical pressing time is 1–18 seconds/mm of board thickness. For example, the duration of pressure is from approximately four to approximately six minutes for a three-quarter inch thick panel.

To ensure a balanced panel, both sheets 14 of incised green wood veneer within the unconsolidated panel should be selected to be within a similar range of moisture content. In practice, it has been found that the green veneer can be sorted into moisture groups having 30% to 49%, 50% to 80%, 81% to 100% and greater than b 100% moisture based on oven-dry weight of the veneer.

Hot pressing typically generates steam from water inside the green veneer which in turn "injects" itself inwardly through the incisions. This drives the heat faster into the core layer and assists in the wood plasticization and resin curing process. The process requires a high-moisture tolerant adhesive that cannot be washed out by steam.

Once resins inside the unconsolidated panel 10 have been cured, the resultant consolidated panel 10 may be sanded and hardwood veneer applied to one or both sides in a normal veneering process similar to hardwood plywood.

Thus the above process produces a multiple-ply panel in one step and eliminates the need to dry, sort and otherwise process the wet wood veneer. In particular, it eliminates the need to dry the wet veneers before bonding the veneers together with the adhesive. Further, no cold processing steps are utilized. It also eliminates the need for a veneer drying or the use of natural gas as a fuel source. The platens may be steam heated and the fuel for generating the steam may be wood waste hence converting scrap into fuel rather than requiring natural gas.

The above description is intended in an illustrative rather than a restrictive sense. Variations to the exact process parameters set out may be apparent to those skilled in the relevant art without departing from the scope of the invention as defined by the claims set out below.

What is claimed is:

1. A method for making a multiple-ply wood panel composite comprising the steps of:
    (i) forming a panel substrate by sandwiching an uncured resinated mat between two sheets of green incised wood veneer, said sheets of green veneer having an overall moisture range from 30% to over 100% based on a dry weight of said sheets;
    (ii) applying a thermosetting and moisture compatible adhesive between the veneer sheets and the resinated mat to form an unconsolidated panel;
    (iii) without performing a drying step and a cold processing step, applying pressure and heat to the unconsolidated panel in an amount and for a duration sufficient to inject steam generated from water inside the sheets of green veneer through the incisions toward the mat to substantially simultaneously cure the resin in the mat and the adhesive between the mat and sheets of veneer, whereby green veneers are used to form the multi-ply wood panel composite without performing a drying step and a cold pressing step.

2. The method of claim 1 wherein:
    said resinated mat is formed from at least one member selected from the group consisting of wood wafers, wood strands, wood particles, wood fibres, wood veneer and lumber.

3. The method of claim 2 wherein:
    said resinated mat is of randomly oriented wafers or strands.

4. The method of claim 3 wherein:
    said sheets of green veneer are selected to be within a close range of moisture contents.

5. The method of claim 4 wherein:
    said sheets of green veneer are selected from common groups of sheets sorted into moisture ranges of from 30% to 49%, 50% to 80%, 81% to 100% and over 100% based on the dry weight of said sheets.

6. The method of claim 5 wherein:
    said green veneer ranges from 2.5 mm ($\frac{1}{10}$"), 3 mm ($\frac{1}{8}$") to 4 mm ($\frac{1}{7}$") in thickness, 1.22 m×2.44 m (4 ft×8 ft) and 1.0 m×2.0 m (3 ft×6 ft) in nominal sizes.

7. The method of claim 1 wherein:
    said adhesive is an MDI resin or equivalent resin system;
    said adhesive is applied to a rate of from 35 to 70 grams per square meter;

said adhesive is cured at a temperature of from 130° C. to 190° C., at a specific pressure of from 24 to 28 kg/cm² and for 12–16 seconds/mm of panel thickness.

8. The method of claim 1 wherein:

said resinated mat includes a binder which is a powder or liquid phenolic resin applied with slack or emulsified wax.

9. The method of claim 8 wherein:

said binder is applied in an amount of from 1.75% to 2.5% by weight of wood flakes on an oven-dry basis.

10. The method of claim 7 wherein;

said resinated mat includes a binder which is a powder or liquid phenolic resin applied with slack of emulsified wax.

11. The method of claim 10 wherein:

said binder is applied in an amount of from 1.75% to 2.5% by weight of wood flakes on an oven-dry basis.

12. The method of claims 1, 2, 3, 4, 5, 6, 7, 8, 9, 10 or 11 wherein:

said green incised wood veneer sheets are incised all the way through their respective thicknesses with incisions equally spaced throughout the veneer sheet.

13. The method of claim 12 including further steps of:

(iv) sanding opposite faces of said composite panel after said curing of step (iii); and (v) applying decorative veneer to at least one of said opposite faces.

14. The method of claim 1, wherein said sheets of green veneer are selected from common groups of veneer sheets, said sheets of green veneer having the same range of moisture content in a given panel in step (i).

15. The method of claim 1, wherein the duration of pressure is from approximately 4 to 6 minutes.

16. A method of making hardwood, said method consisting essentially of:

sorting wet green veneers into groups having similar moisture content, said green veneers not being subject to a drying step and having a moisture content above 30% based on dry weight of the sheets;

selecting two green veneers from the same group of moisture content;

making incisions through the green veneers;

applying a binder to a wood mat;

applying a moisture compatible thermosetting adhesive between inner surfaces of the green veneers and the mat;

without performing a drying step and a cold processing step, substantially simultaneously curing both the adhesive and binder by hot pressing n unconsolidated panel of the green veneers at a temperature of 130° C.–190° C. for a duration of 4–6 minutes to inject steam generated from water inside the green veneers through the incisions toward the mat to substantially simultaneously cure the resin and the thermosetting adhesive to form a composite panel without requiring the green veneers to be previously dried;

sanding an outer surface of the panel; and applying a decorative veneer to the sanded surface of the panel.

* * * * *